(12) United States Patent
Daniels et al.

(10) Patent No.: US 10,823,271 B2
(45) Date of Patent: Nov. 3, 2020

(54) TRANSMISSION BETWEEN A COMBUSTION ENGINE AND A COMPRESSOR ELEMENT AND A COMPRESSOR INSTALLATION PROVIDED WITH SUCH A TRANSMISSION

(71) Applicant: ATLAS COPCO AIRPOWER, NAAMLOZE VENNOOTSCHAP, Wilrijk (BE)

(72) Inventors: Ivo Daniels, Wilrijk (BE); Stephan Willem Van Praet, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 289 days.

(21) Appl. No.: 15/761,306

(22) PCT Filed: Sep. 27, 2016

(86) PCT No.: PCT/BE2016/000048
§ 371 (c)(1),
(2) Date: Mar. 19, 2018

(87) PCT Pub. No.: WO2017/066852
PCT Pub. Date: Apr. 27, 2017

(65) Prior Publication Data
US 2018/0266534 A1      Sep. 20, 2018

(30) Foreign Application Priority Data

Oct. 7, 2015   (BE) .................................. 2015/5637

(51) Int. Cl.
*F16H 57/00*      (2012.01)
*F04C 29/00*      (2006.01)
(Continued)

(52) U.S. Cl.
CPC ......... *F16H 57/0006* (2013.01); *F04C 18/16* (2013.01); *F04C 29/005* (2013.01); *F16H 57/023* (2013.01); *F16H 57/028* (2013.01)

(58) Field of Classification Search
CPC .. F16H 57/0006; F16H 57/028; F16H 57/023; F16H 57/029; F16H 2057/02069; F04C 18/16; F04C 29/005; F04C 29/0085
See application file for complete search history.

(56) References Cited

U.S. PATENT DOCUMENTS 1,506,918 A    9/1924   Von Soden-Fraunhofen
3,915,026 A    10/1975  Otto
(Continued)

FOREIGN PATENT DOCUMENTS

CN   102102659 A   6/2011
CN   102971536 A   3/2013
(Continued)

OTHER PUBLICATIONS

International Search Report dated Aug. 3, 2017 on PCT/BE2016/000048.

*Primary Examiner* — Essama Omgba
*Assistant Examiner* — Christopher J Brunjes
(74) *Attorney, Agent, or Firm* — Bacon & Thomas, PLLC

(57) ABSTRACT

Transmission between a combustion engine with a crankshaft and a compressor element with driven shaft, whereby this transmission includes a housing and at least one driven gear and driveshaft with a drive gear, wherein the driveshaft of the transmission is connected to the crankshaft of the combustion engine by means of a rigid coupling, and the distance between the driveshaft and the driven shaft is greater than a sum of the radii of a plurality of pitch circles of the drive gear and the driven gear.

12 Claims, 2 Drawing Sheets

(51) Int. Cl.
*F04C 18/16* (2006.01)
*F16H 57/023* (2012.01)
*F16H 57/028* (2012.01)

(56) References Cited

U.S. PATENT DOCUMENTS

| | | | | |
|---|---|---|---|---|
| 4,051,492 | A * | 9/1977 | Laskin | G03B 17/52 |
| | | | | 396/40 |
| 5,035,590 | A | 7/1991 | Steffens | |
| 6,478,560 | B1 * | 11/2002 | Bowman | F04C 23/001 |
| | | | | 418/1 |
| 6,688,288 | B1 * | 2/2004 | Houston | F02M 35/162 |
| | | | | 123/456 |
| 2003/0073359 | A1 * | 4/2003 | Kameoka | F01M 11/02 |
| | | | | 440/88 L |
| 2007/0202980 | A1 * | 8/2007 | Hur | B66B 11/0453 |
| | | | | 475/154 |
| 2014/0271136 | A1 * | 9/2014 | Creager | F02B 39/10 |
| | | | | 415/123 |

FOREIGN PATENT DOCUMENTS

| | | | |
|---|---|---|---|
| EP | 0287797 | A2 | 10/1988 |
| GB | 760091 | A | 10/1956 |
| JP | 63277882 | A | 11/1988 |
| JP | H08-74976 | A | 3/1996 |
| JP | H09-296858 | A | 11/1997 |
| JP | H09296858 | A | 11/1997 |
| JP | 2003-120796 | A | 4/2003 |
| JP | 2004003571 | A | 1/2004 |
| JP | 2014214740 | A | 11/2014 |
| JP | 2016-044769 | A | 4/2016 |
| SU | 1161740 | A | 6/1985 |

* cited by examiner

TRANSMISSION BETWEEN A COMBUSTION ENGINE AND A COMPRESSOR ELEMENT AND A COMPRESSOR INSTALLATION PROVIDED WITH SUCH A TRANSMISSION

The present invention relates to a transmission between a combustion engine and a compressor element and a compressor installation provided with such a transmission.

BACKGROUND OF THE INVENTION

Such a transmission, also called a 'transmission box', is provided with gears or similar that bring about a coupling between a driveshaft and a driven shaft so that the compressor element is driven by the combustion engine, whereby a suitable transmission ratio is realised so that the speed of the driveshaft is converted into a different speed of the driven shaft.

More specifically the invention is intended for mobile or portable compressor installations that are driven by a combustion engine, in contrast to industrial compressor installations that are driven by an electric motor.

It is known that the combustion engine produces torsional vibrations on its outgoing shaft as a result of the fluctuating or varying torque that is generated by the combustion process, among others due to the variable action of the pistons on the crankshaft.

It is known that the compressor element also produces torsional vibrations as a result of the compression process, among others by the opening and closing of the outlet port of the compressor element.

The resultant of these torsional vibrations will act on the transmission as a varying torque, such that unpleasant noises can arise and damage can occur if these torque variations are not kept under control.

These torques can also vary such that a negative torque can arise, which means that the compressor element will drive the combustion engine. In the event of such a negative torque the teeth of the driven gear will separate from the teeth of the drive gear, and the teeth will make contact with one another with their other flanks. If this happens repeatedly the teeth experience a variable load, which is detrimental for the lifetime of the gear. At the same time the teeth will continually mesh and collide with each other, which can cause unpleasant noise.

In order to keep these torsional vibrations of the combustion engine and the compressor element under control, use is made of an elastic coupling that is affixed between the combustion engine and the driveshaft. As a result the torsional vibrations of the engine are largely kept out of the transmission box.

In the aforementioned industrial compressor installations that are driven by an electric motor, an elastic coupling is not required because the electric motor will not generate any torsional vibrations and the transmission can absorb the torsional vibrations of the compressor element.

An elastic coupling is not present either in other devices driven by a combustion engine, because the driven component generates very limited torsional vibrations, if at all.

In other words it is the combination of the torsional vibrations of the combustion engine and the compressor element that will ensure that an elastic coupling between the combustion engine and the driveshaft is necessary.

An elastic coupling is not only used to dampen the torsional vibrations of the combustion engine, but also to absorb the inaccuracy in the rotational motion of the crankshaft and the flywheel.

The bearings in the combustion engine are much less rigid and present greater play than in an electric motor, for example, so that the crankshaft and the flywheel make a certain eccentric motion, i.e. a rotational motion that does not coincide with the axis, so that 'runout' occurs.

If the driveshaft is coupled directly to the crankshaft and the flywheel of the combustion engine, this will result in the drive gear also making an eccentric motion, so that during its rotation it will come closer to and then further away from the driven gear, such that the gears can jam or such that the rotational motion of the crankshaft is disturbed with possible premature wear of engine components.

Alignment errors during the construction of the compressor installation can also cause deviations.

An elastic coupling can absorb these deviations.

Such elastic couplings have the disadvantage that they are relatively large and expensive. Moreover, they make the device more complex.

However, for mobile compressor installations it is important that they are as compact, robust and cheap as possible.

When the transmission is realised by means of a belt drive, the use of the elastic coupling is superfluous because the belt used is itself somewhat flexible and can absorb the torsional vibrations and deviations in the rotational motion.

However, such a belt is highly susceptible to wear such that it regularly has to be replaced, which is detrimental to the robustness and cost of the compressor installation.

SUMMARY OF THE INVENTION

The purpose of the present invention is to provide a solution to at least one of the aforementioned and other disadvantages by providing a transmission between a combustion engine and a compressor element that enables the elastic coupling to be omitted.

The present invention concerns a transmission between a combustion engine with an outgoing shaft and a compressor element with driven shaft, whereby this transmission comprises a housing and at least one driven gear and a driveshaft with drive gear, whereby the driveshaft of the transmission is connected to the outgoing shaft of the combustion engine by means of a rigid coupling and that the distance between the driveshaft and the driven shaft is greater than the sum of the radii of the pitch circles of the drive gear and the driven gear.

A rigid coupling means that the driveshaft is mounted directly on the outgoing shaft of the engine, which means directly to the flywheel and crankshaft of the engine. This is in contrast to an elastic coupling or flexible coupling, with which alignment errors can be absorbed and/or vibrations can be damped.

The 'outgoing shaft' of the combustion engine has to be interpreted widely here, it is in fact the component of the engine that can drive the gearbox, for example the crankshaft that can be provided with a shaft end for coupling to a transmission, or a flywheel that is mounted on the end of the crankshaft.

The pitch circle of the drive gear and the driven gear is the circle that goes through the centre of the height of the teeth of the gears.

An advantage is that by using a rigid coupling, the transmission is more compact, cheaper and simpler compared to a transmission with an elastic coupling.

Another advantage is that by a choosing the distance between the driveshaft and the driven shaft to be greater, the play or space between the meshed teeth of the gears, also called backlash, is greater. As a result the negative torsional vibrations can be absorbed and a negative torque can be prevented so that unpleasant noises and damage are prevented.

Another advantage is that the deviation in the position of the gears during rotation, for example as a result of the eccentric motion of the crankshaft and the flywheel and assembly tolerances, can occur freely due to the greater distance between the driveshaft and the driven shaft. The free movement of the crankshaft is not affected and damage to engine components is prevented.

By choosing the distance between the driveshaft and the driven shaft to be greater, it will not be necessary to use a belt transmission when omitting the elastic coupling. As a result the detrimental effects of the belt transmission can be avoided.

Preferably the aforementioned distance between the driveshaft and the driven shaft is equal to the sum of the radii of the pitch circles plus an additional value, whereby this value is greater than or approximately equal to half of the maximum total deviation in the distance between the drive gear and the driven gear, as a result of the eccentric motion of the crankshaft and any alignment errors and assembly tolerances.

This has the advantage that the jamming of the gears can be prevented and that the play or space between the meshed teeth of the gear, also called backlash, is large enough to prevent the negative effects of the torsional vibrations and the negative torque.

Moreover, the forces and stresses on the ends of the teeth of the gears can be limited by choosing the aforementioned value to be approximately equal to half of the maximum total deviation, so that the gears can be manufactured from standard material: in other words, there is no need for special, extra hard or sturdy materials.

The invention also concerns a compressor installation with a compressor element and a combustion engine, whereby the compressor installation is provided with a transmission according to the invention.

BRIEF DESCRIPTION OF THE DRAWINGS

With the intention of better showing the characteristics of the invention, a few preferred embodiments of a transmission and compressor installation according to the invention are described hereinafter, by way of an example without any limiting nature, with reference to the accompanying drawings, wherein.

DETAILED DESCRIPTION OF THE INVENTION

Figure 1:
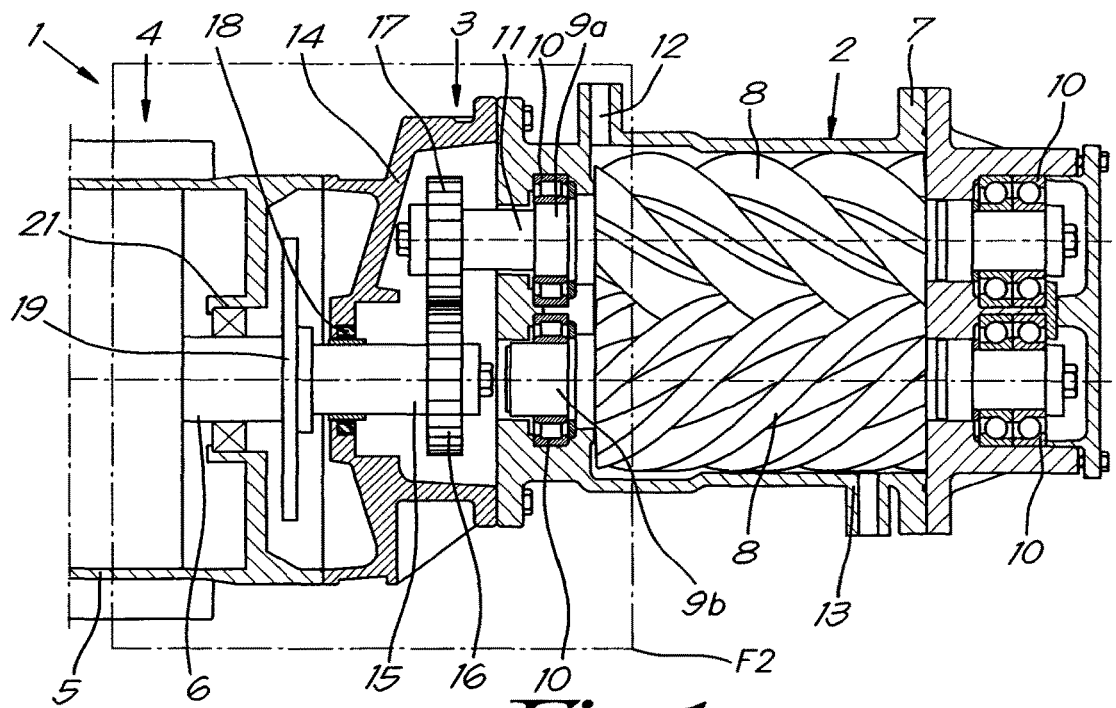
FIG. 1 schematically shows a compressor installation according to the invention.

The compressor installation 1 shown in FIG. 1 essentially comprises three parts:
a compressor element 2;
a transmission 3;
a combustion engine 4.

According to the invention the drive is a combustion engine 4, in this case, but not necessarily, a diesel engine.

The combustion engine 4 comprises an engine housing 5, in which the crankshaft 6 and the plain bearings 21, among others, are affixed. The outgoing shaft of the combustion engine 4 extends through the engine housing 5 into the transmission 3.

In this case, but not necessarily, the outgoing shaft is the end of the crankshaft 6 with a flywheel 19 mounted thereon. The outgoing shaft can also be the end of the crankshaft 6 itself, or a shaft end of the crankshaft 6 specially provided for this purpose.

In the example shown the compressor element 2 is a screw compressor element, but of course the invention is not limited to this.

The compressor element 2 comprises a compressor housing 7 in which two meshed screw rotors 8 are affixed. The screw rotors 8 are provided with a shaft 9a, 9b. The ends of these shafts 9a, 9b are provided with bearings 10 with which the screw rotors 8 are rotatably mounted in the compressor housing 7.

One shaft 9a extends by one end 11 through the compressor housing 7 into the transmission 3. This shaft 9a will act as the driven shaft 9a.

Furthermore the compressor housing 7 is provided with an inlet 12 for the supply of gas to be compressed, in this case air, and an outlet 13 for the removal of compressed gas, in this case compressed air. The outlet 13 can be connected to a pressure pipe, not shown, that leads to a consumer network.

Figure 2:
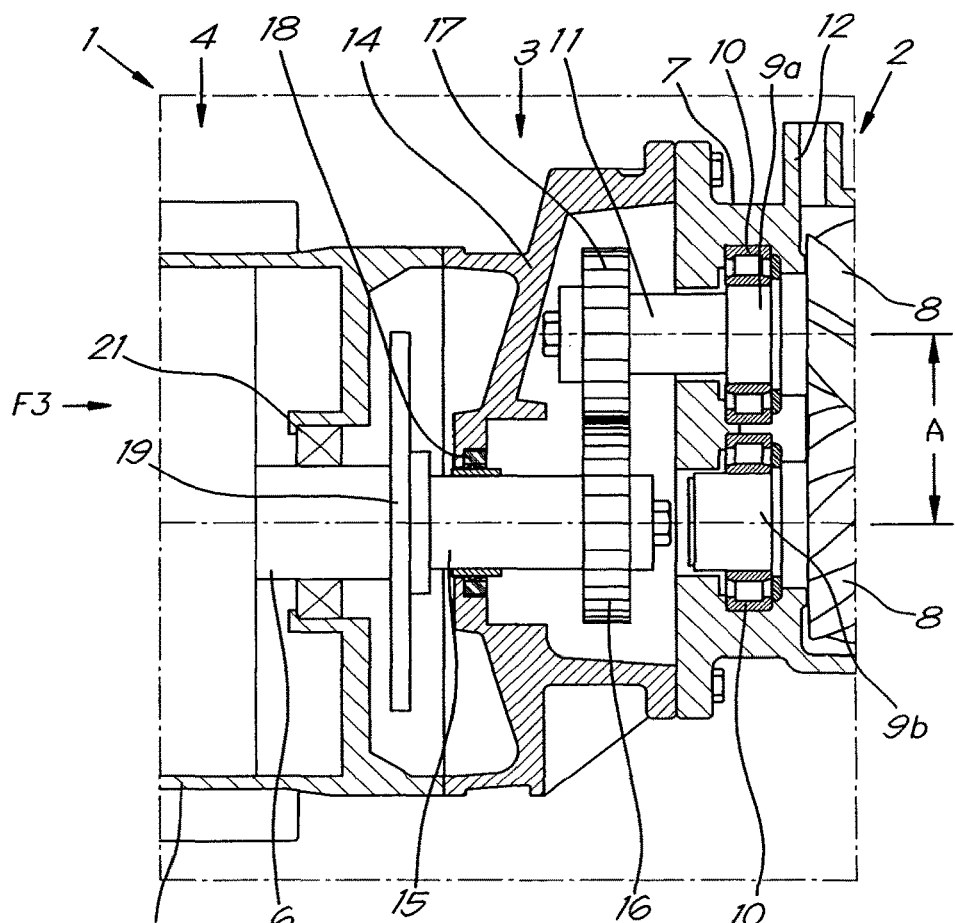
FIG. 2 shows the section indicated by F2 in FIG. 1 in more detail.

The transmission 3 is a transmission box according to the invention, and is shown in more detail in FIG. 2.

The transmission 3 comprises a housing 14 in which a driveshaft 15 with a drive gear 16 are affixed.

On the aforementioned end 11 of the driven shaft 9a of the compressor element 2 a driven gear 17 is affixed with which the drive gear 16 can mesh.

It is clear that it is not excluded that additional gears can be placed between the drive gear 16 and the driven gear 17.

It is also not excluded that a second or third compressor element 2 is driven by the same transmission box. Each compressor element 2 then has its own driven shaft with driven gear.

In order to ensure the good operation of the transmission 3, lubricant can be applied that will ensure the lubrication between the gears 16, 17.

In the example shown a shaft seal 18 is affixed around the driveshaft 15 in the housing 14 of the transmission 3.

This shaft seal 18 will prevent lubricant from being able to leak away into the combustion engine 4.

This shaft seal 18 is of the 'lip seal' type for example, but can be any type of shaft seal 18 that is usual for sealing rotating shafts.

According to the invention the driveshaft 15 is coupled to the crankshaft 6 of the combustion engine 4 by means of a rigid coupling via the flywheel 19.

However, it is also possible that the rigid coupling is realised directly between the crankshaft 6 and the driveshaft 15, or that the rigid coupling is realised between a shaft end of the crankshaft 6 provided for this purpose and the driveshaft 15.

As the rigid coupling to the flywheel 19 is much more compact than an elastic coupling, this will be easy to realise with a transmission 3 and a housing 14 that is smaller and less complex.

Preferably, the aforementioned rigid coupling is affixed in the space between the housing 14 of the transmission 3 and the housing 5 of the combustion engine 4.

Figure 3:
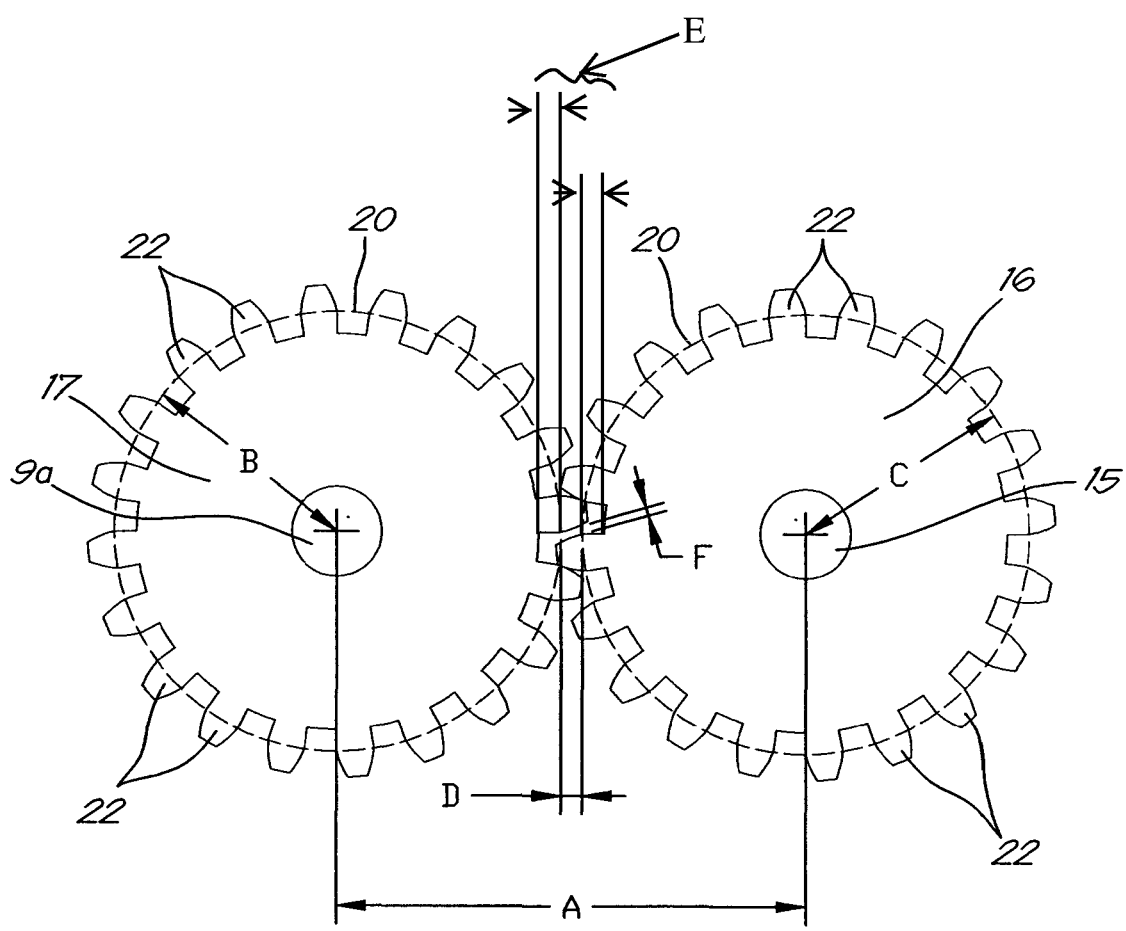
FIG. 3 shows a view according to the arrow F3 in FIG. 2.

According to invention the distance A between the driveshaft 15 and the driven shaft 9a is greater than the sum of the radii B and C of the pitch circles 20 of the drive gear 16 and the driven gear 17. This is schematically shown in FIG. 3.

This means that the pitch circles 20 of the gears 16, 17 will no longer touch one another.

Preferably the aforementioned distance A is equal to the sum of the radii B and C of the pitch circles plus an additional value D, whereby this value D is equal to half of the maximum total deviation E of the distance between the drive gear 16 and the driven gear 17, as a result of the eccentric motion of the crankshaft and any alignment errors and assembly tolerances.

It is of course not excluded that the value D is greater than or approximately equal to half of the maximum total deviation E.

The aforementioned deviation E is the result of the application of the rigid coupling, among others, such that the eccentric motion of the crankshaft 6 of the combustion engine 4 will be transferred to the driveshaft 15 and the drive gear 16.

The eccentric motion of the driven gear 17, even though it is much smaller, will contribute to the aforementioned deviation E.

Lastly, the assembly tolerance and alignment errors will have an influence on the deviation E.

The sum of all the different contributions will result in the maximum total deviation E.

The aforementioned value D is equal to E/2.

This means that the eccentric motion of the gears 16, 17 can be absorbed.

As a result, a play F or backlash occurs between the teeth 22 of the gears that is greater than when the pitch circles 20 of the gears 16, 17 touch one another.

As a result a negative torque due to the large torsional vibrations can be prevented or reduced.

In the example shown, the gears 16, 17 have straight teeth. This has the advantage that the gears 16, 17 will not exert any axial forces on the driveshaft 15 and the driven shaft 9a.

This is especially important for the driveshaft 15: by using a rigid coupling the axial forces will be passed on to the crankshaft 6 of the combustion engine 4.

As the crankshaft 6 is mounted on plain bearings 21 in the engine housing 5, such axial forces must be prevented or at least limited as much as possible.

It is not excluded that the gears 16, 17 have oblique teeth with a limited helix, instead of straight teeth, whereby the teeth 22 are at a maximum angle of 15 degrees to the driveshaft 15 or the driven shaft (9b) respectively. The usual helix angle in conventional gearboxes is 20 to 35 degrees.

The axial forces that are coupled to gears 16, 17 with oblique teeth with a limited helix will remain limited so that the combustion engine 4 and the plain bearings 21 can absorb them.

The operation of the compressor device 1 is very simple and as follows.

When the combustion engine 4 is set into operation, it will rotate the crankshaft 6. The motion of this crankshaft 6 is transferred to the driveshaft 15 of the transmission 3 via the rigid coupling to the flywheel 19.

This rotational motion of the driveshaft 15 is transferred with a suitable transmission ratio, via the drive gear 16 and the driven gear 17, to the driven shaft 9a of the compressor element 2.

As a result the screw rotor 8 concerned will rotate and the other screw rotor 8 will rotate with it due to the lobes rotating in one another.

In this way the combustion engine 4 can drive the compressor element 2.

The compressor element will be able to draw in gas via the inlet 12 and compress it by means of the rotating screw rotors 8. The compressed gas will be able to leave the compressor element 2 via the outlet 13.

The torsional vibrations that occur during the operation of the combustion engine 4 and the compressor element 1 can result in a negative torque. Due to the play F between the teeth 22 of the gears 16, 17 this negative torque can be reduced or even prevented.

The additional distance D between the driveshaft 15 and the driven shaft 9a will absorb the deviations in the positions of the gears 16, 17 with respect one another during their rotation so that the gears 16, 17 cannot jam. The 'free' rotation of the crankshaft is not affected and damage to the engine components is prevented.

As a result of the higher torsional vibrations with respect to a conventional transmission with flexible coupling, and as a result of the additional distance D between the driveshaft 15 and the driven shaft 9a, the teeth will be more heavily loaded. They are designed for this situation.

In this way the good operation of the transmission 3 with the rigid coupling via the flywheel 19 can be guaranteed.

The present invention is by no means limited to the embodiments described as an example and shown in the drawings, but a transmission and compressor installation according to the invention can be realised in all kinds of forms and dimensions without departing from the scope of the invention.

The invention claimed is:

1. A compressor installation with a compressor element and a combustion engine, the compressor installation comprising a transmission between the combustion engine with a crankshaft and said compressor element with a driven shaft,
   wherein the transmission comprises a housing and at least one driven gear and a driveshaft with a drive gear,
   wherein the driveshaft of the transmission is connected to the crankshaft of the combustion engine by a rigid coupling, and a distance between the driveshaft and the driven shaft is greater than a sum of a radius of a pitch circle of the drive gear and a radius of a pitch circle of the driven gear,
   wherein the distance is equal to the sum of the radii of the pitch circles plus an additional value, wherein the additional value is greater than or approximately equal to half of a maximum total deviation in the distance between the drive gear and the driven gear.

2. The compressor installation according to claim 1, wherein the combustion engine is a diesel engine.

3. The compressor installation according to claim 1, wherein the compressor element is a screw compressor element.

4. The compressor installation according to claim 1, wherein a shaft seal is affixed around the driveshaft in the housing of the transmission and configured to prevent a lubricant, that is used to lubricate the transmission, from leaking away to the combustion engine.

5. The compressor installation according to claim 4, wherein the shaft seal is a lip seal.

6. The compressor installation according to claim 1, wherein the drive gear and the driven gear have straight teeth.

7. The compressor installation according to claim 1, wherein the drive gear and the driven gear have oblique teeth with a limited helix, whereby the teeth are at a maximum angle of 15 degrees to the driveshaft or the driven shaft respectively.

8. The compressor installation according to claim 1, wherein the additional value is equal to half of the maximum total deviation in the distance between the drive gear and the driven gear.

9. The compressor installation according to claim 1, wherein the rigid coupling is affixed in a space between the housing of the transmission and a housing of the combustion engine.

10. The compressor installation according to claim 1, wherein the rigid coupling is realized directly between the crankshaft and the driveshaft, or the rigid coupling is realized between a shaft end of the crankshaft provided for this purpose and the driveshaft, or the rigid coupling is realized between a flywheel at the end of the crankshaft and the driveshaft.

11. The compressor installation according to claim 1, wherein the maximum total deviation comprises eccentric motion of the crankshaft, any alignment issues, and assembly tolerances of the driveshaft and the driven shaft.

12. A transmission for a compressor installation with a compressor element and a combustion engine, the transmission between a crankshaft of the combustion engine and a driven shaft of the compressor element, the transmission comprising:
- a housing and a driven gear and a driveshaft with a drive gear,
- wherein the driveshaft of the transmission is connected to the crankshaft of the combustion engine by a rigid coupling, and a distance between the driveshaft and the driven shaft is greater than a sum of a radius of a pitch circle of the drive gear and a radius of a pitch circle of the driven gear,
- wherein the distance is equal to the sum of the radii of the pitch circles plus an additional value, and
- wherein the additional value is greater than or approximately equal to half of a maximum total deviation in the distance between the drive gear and the driven gear.

* * * * *